(12) United States Patent
Quillin

(10) Patent No.: US 10,987,543 B2
(45) Date of Patent: Apr. 27, 2021

(54) DUAL MONITORING INSTRUCTION SYSTEM AND METHOD

(71) Applicant: Fred Quillin, Jenison, MI (US)

(72) Inventor: Fred Quillin, Jenison, MI (US)

( * ) Notice: Subject to any disclaimer, the term of this patent is extended or adjusted under 35 U.S.C. 154(b) by 0 days.

(21) Appl. No.: 17/002,678

(22) Filed: Aug. 25, 2020

(65) Prior Publication Data

US 2020/0384315 A1     Dec. 10, 2020

Related U.S. Application Data

(63) Continuation-in-part of application No. 16/190,134, filed on Nov. 13, 2018, now Pat. No. 10,751,572, which is a continuation-in-part of application No. 16/128,316, filed on Sep. 11, 2018, now abandoned.

(60) Provisional application No. 62/557,698, filed on Sep. 12, 2017.

(51) Int. Cl.
*H04N 7/18* (2006.01)
*G09B 5/02* (2006.01)
*A63B 24/00* (2006.01)
*A63B 69/36* (2006.01)

(52) U.S. Cl.
CPC ...... *A63B 24/0075* (2013.01); *A63B 24/0006* (2013.01); *A63B 24/0087* (2013.01); *A63B 69/3661* (2013.01); *A63B 2024/0009* (2013.01); *A63B 2024/0081* (2013.01)

(58) Field of Classification Search
CPC .................................. H04N 7/181; G09B 5/02
USPC ........................................................ 348/159
See application file for complete search history.

(56) References Cited

U.S. PATENT DOCUMENTS

| | | | |
|---|---|---|---|
| 5,749,789 A | 5/1998 | Karl | |
| 6,394,615 B1 | 5/2002 | Hill et al. | |
| 7,835,810 B2 | 11/2010 | Mifsud et al. | |
| 8,138,913 B2 | 3/2012 | Nagel et al. | |
| 9,080,963 B2 | 7/2015 | Alvarez et al. | |
| 2004/0239823 A1 | 12/2004 | Silsby et al. | |
| 2006/0040761 A1 | 2/2006 | Shin | |
| 2006/0276255 A1 | 5/2006 | Hutchison | |
| 2007/0273550 A1 | 11/2007 | Price et al. | |
| 2007/0273751 A1* | 11/2007 | Sachau | H04N 7/14 348/14.02 |
| 2010/0081116 A1 | 4/2010 | Barasch | |
| 2011/0124444 A1* | 5/2011 | Uehling, III | A63B 69/38 473/459 |
| 2013/0123034 A1 | 5/2013 | Pohl | |
| 2014/0308640 A1 | 6/2014 | Forman | |
| 2014/0247363 A1 | 9/2014 | Venable | |
| 2015/0170288 A1 | 6/2015 | Harton et al. | |
| 2015/0338298 A1 | 11/2015 | Sutter et al. | |

(Continued)

*Primary Examiner* — Jeffery A Williams
(74) *Attorney, Agent, or Firm* — Charles Runyan; Runyan Law

(57) ABSTRACT

A monitoring system that includes a processor, one or more video cameras, a student monitor, and an instructor monitor. The processor can transmit and receive digital information to and from the video cameras and monitors. The student monitor and the instructor monitor are each also able to communicate digitally with the processor and may each play video as received from the processor. The processor may transmit either a live or recorded video signal to both the student monitor and the instructor monitor, such that the student monitor and the instructor monitor receive and play video simultaneously.

6 Claims, 5 Drawing Sheets

(56) References Cited

U.S. PATENT DOCUMENTS

| | | |
|---|---|---|
| 2017/0032466 A1 | 2/2017 | Feldman |
| 2017/0296898 A1 | 4/2017 | Brosseau |
| 2017/0191607 A1* | 7/2017 | Huang ................... F16M 11/10 |
| 2018/0197012 A1* | 7/2018 | Wengrovitz .............. G06T 7/20 |

* cited by examiner

DUAL MONITORING INSTRUCTION SYSTEM AND METHOD

CROSS REFERENCE TO RELATED APPLICATIONS

This application relates to, claims priority to, and incorporates by reference currently pending U.S. patent application Ser. No. 16/190,134, filed Nov. 13, 2018, pending, which relates to, claims priority to, and incorporates by reference U.S. patent application Ser. No. 16/128,316, filed Sep. 11, 2018, which relates to, claims priority to, and incorporates U.S. provisional patent application 62/557,698, filed Sep. 12, 2017.

BACKGROUND OF THE INVENTION

The following includes information that may be useful in understanding the present disclosure. It is not an admission that any of the information is prior art nor material to the presently described or claimed inventions, nor that any publication or document that is explicitly or implicitly referenced is prior art.

TECHNICAL FIELD

The present invention generally relates to the field of systems of existing art and more specifically relates to a golfer's instruction monitoring system.

RELATED ART

Many people enjoy the game of golf. Golf is a club and ball sport in which players use various clubs to hit balls into a series of holes on a course in as few strokes as possible. While golf is often played merely for relaxation, comradery, and enjoyment, golf can also be a competitive sport. As a result, many golfers train to improve their technique and are continually looking for ways to improve their game.

Many instructors focus on teaching proper swing techniques using video feedback. Teaching often includes an instructor recording a golfer's swing and then halting activity and conducting a post swing analysis of the positive and negative aspects associated with the student's swings. They may also playback the video for the student to share commentary and recommendations. However, because the student is not able to see or feel what a mistake feels like in the moment and understand what a good swing feels like, this process can be confusing, embarrassing, and ineffective. The recordings and post swing analysis do not enable the instructor to share on the spot feedback and instruction, which can be beneficial and help the student achieve faster and more significant results.

U.S. Pat. No. 7,780,450 to Robin Tarry relates to a video instructional system and method for teaching motor skills. The described video instructional system and method for teaching motor skills include a system by which a real time camera image of a student is displayed to the student while the student is performing a physical activity. The student can switch between seeing his natural field of view and the live video image by refocusing his eyes. Additionally, instructional information may be overlaid on the real time video, thus enhancing the learning process.

SUMMARY OF THE INVENTION

The general purpose of the present disclosure is to provide a dual monitoring sports instruction system and method.

The instruction system includes a processor, one or more video cameras, a student monitor, and an instructor monitor. The processor can transmit and receive digital information. The video cameras can communicate digitally with the processor and can record video and transmit the video signal to the processor. The first and second monitors are each also able to communicate digitally with the processor and may each play video as received from the processor. The processor may transmit either a live or recorded video signal to both the student monitor and the instructor monitor, such that the student monitor and the instructor monitor receive and play video simultaneously.

According to another embodiment, a method of displaying a video feed to a student and an instructor simultaneously is also disclosed. The method of displaying a video feed to a student and an instructor simultaneously includes providing the above described monitoring system, recording video footage via the video cameras, transmitting the live video signal from one or more video cameras to the central processor, transmitting the live video signal from the central processor to both the student monitor and the instructor monitor simultaneously, selecting at least one of one or more video cameras for viewing, and playing the recorded video signal for viewing.

For purposes of summarizing the invention, certain aspects, advantages, and novel features of the invention have been described. Not necessarily all such advantages may be achieved by any one particular embodiment of the invention. Thus, the invention may be embodied or carried out in a manner that achieves or optimizes one advantage or group of advantages without necessarily achieving other advantages. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, a dual monitoring instruction system and method, constructed and operative according to the teachings of the present disclosure.

The various embodiments of the present invention will be described in conjunction with the appended drawings, in which like designations denote like elements.

DETAILED DESCRIPTION

Figure 1:
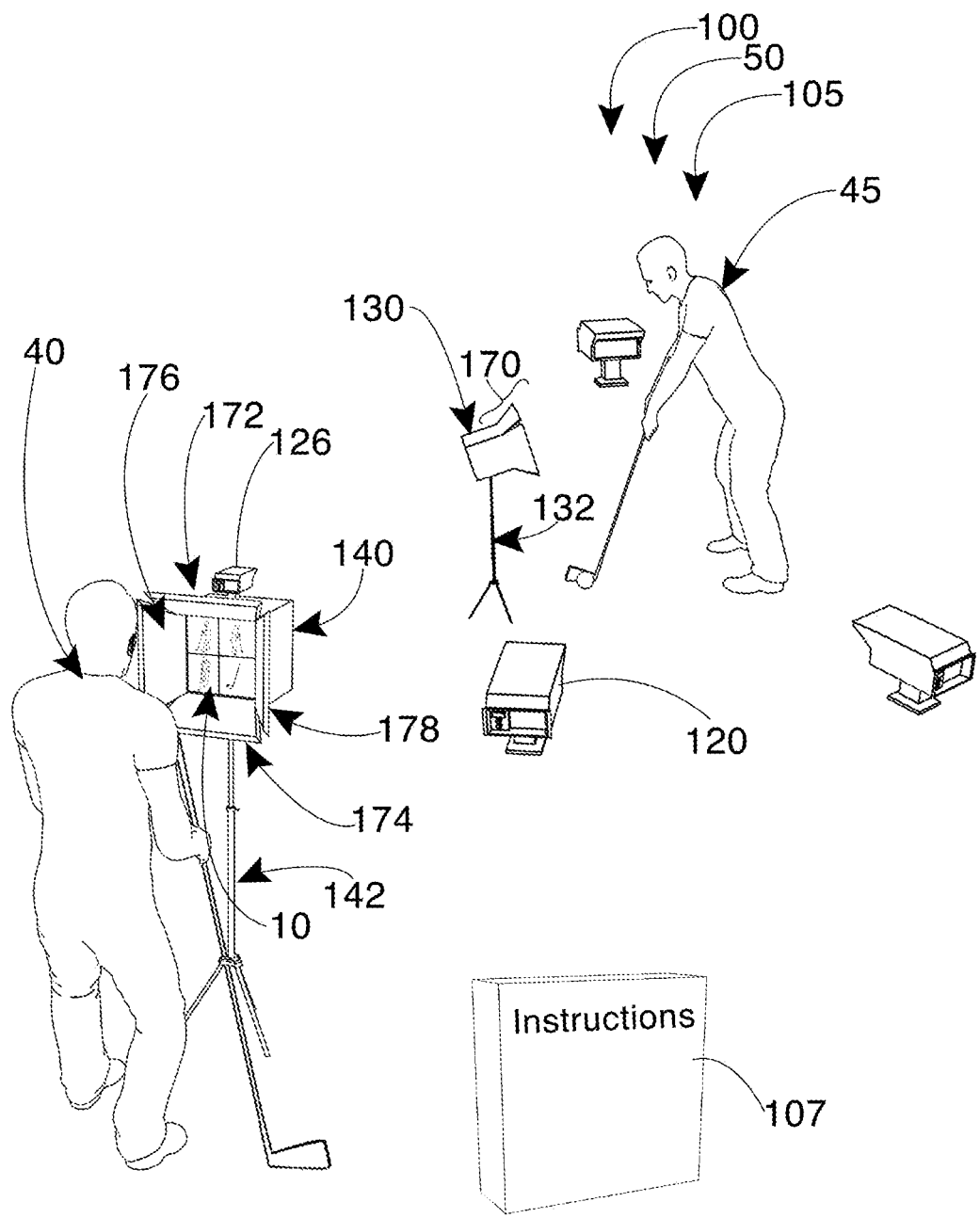
FIG. 1 is a perspective view of the monitoring system during an 'in use' condition, according to an embodiment of the disclosure.

As discussed above, embodiments of the present disclosure relate to a system and more particularly to a dual monitoring instruction system and method as used to improve simultaneously displaying a video feed to a student and an instructor.

Generally, the system is a monitoring system that can be viewed by an instructor and student simultaneously in real time. While a primary application of the system is for golfing instruction, the system may be useful for any situation in which a student and an instructor desire to simultaneously view the student's technique either in real time or as recorded. That is, instruction in which immediate feedback from the instructor is useful such as yoga, baseball swinging, basketball free throws, personal exercise training, tennis, etc. The system may be used by a single user but is most advantageous when used by a student and an instructor simultaneously. In some version, the system includes at least four, closed circuit television cameras and an instructor monitor and student monitor each able to display footage from the cameras. The system can be configured to use wireless or wired cameras. In use, the system is a training aid that allows both the instructor and the student to view and analyze techniques in real time or recordings. This configuration enables the complete or partial recording of training sessions. In some embodiments, additional auxiliary devices may interface with the system, including smartphones, tablets, or laptops. In such embodiments, the auxiliary devices may be used as additional monitors to view or playback the same footage as the student monitor and the instructor monitor. Viewing the live or recorded footage may assist the student in identifying and analyzing mistakes in their technique in a way not possible otherwise. This usage may help develop and promote muscle memory for improved techniques.

The system may include multiple cameras to record footage of a student, an instructor monitor optionally placed on an instructor portable podium, a student monitor optionally placed on a student adjustable monitor, and a processor connecting the cameras, instructor monitor, and student monitor. The system may also include one or more transceivers for enabling the components to communicate with each other. Additionally, the system may include a portable hitting area that is useful as a guideline for placement of the users, the cameras, the instructor monitor, and the student monitor. More than four cameras may be added for any view angle or perspective (e.g., from above), providing the users with a variety of viewing angles from which to analyze their technique. The cameras send a picture feed to the processor. One instructor monitor may receive all camera feeds from the processor. Likewise, one student monitor may receive all the camera feeds from and to the processor in tandem with the instructor monitor. The processor may be a personal computer using the appropriate software in some embodiments. The instructor monitor will, in turn, have the ability to review activity from one or more cameras simultaneously or selectively. This review may be enacted remotely. The system may also include a power source, such as a battery, which allows several hours of operation. In these or other versions, the system incorporates power adapters for utilizing 120V household voltage sources. In some embodiments, one or more of the monitors can have touchscreen or pen input capability. With that type of input capability, an instructor could draw on the video to highlight certain aspects of the recorded activity. An instructor could use this functionality to indicate at what point in the swing for instance the student needs to modify or to indicate a change in body position etc.

In these or other embodiments, the system could transmit an instructor's motion in real time or recorded for later playback to the student's monitor. In such embodiments, the instructor could use the pen input or touchscreen capability to highlight the correct portions of the instructor's swing. For instance, the instructor could indicate a portion of the swing for the student to focus on.

The system may also include a portable hitting area. The hitting area may be a flat, deployable surface having indicia for guiding the placement of the user and the components of the system in use. The hitting area may include indicia, such as for positioning a player's feet, where the user is to swing and hit a golf ball, and where the user is to aim the golf ball's trajectory.

In operation, the student stands on the hitting area at the indicated position. The student monitor may be located directly adjacent to the swing path of the club in a position viewable by the student as they swing. Cameras may be aimed at the student at various angles and focus to record aspects of the student's technique. The instructor monitor may be placed where an instructor may view it. In some circumstances, the instructor monitor may be an external mobile device rather than the dedicated monitor. The monitor may enable the instructor to focus on the student's swing patterns and make recommendations to the student in real time. Throughout a training session, both the student and instructor may have the ability to view the student's performance on the same video feed of the student's technique. In some embodiments, the system may be further equipped with sensory devices able to measure and display data such as swing speed. The instructor monitor may also be able to record the camera video feeds for later review. For example, some instructors feel that to improve the putting stroke, the putter head path to the ball should be square to the target. The system allows cameras to be stationed for a ground view, which can show the path the putter head takes to the ball and the target. The exact specifications of the system components may vary.

In some embodiments, a home system could use 1 to 4 cameras where students could use one camera and one monitor to view themselves practice their swing. Further, if desired, a split screen could be used (not required) with an instructional feed. In a similar manner, students could watch themselves at home after taking lessons. They could also view instructional materials before or during their practice at home. In addition, a hitting net could be used in a back yard or an outbuilding. In these or other embodiments, the camera could also be positioned on the ground to view the path of the putter as a putt is stroked.

Referring now to the drawings by reference numerals, FIGS. 1-4 show various views of a monitoring system 100.

FIG. 1 shows a monitoring system during an 'in use' condition 50, according to an embodiment of the present disclosure. Here, the monitoring system may simultaneously display a video feed to a student and an instructor. As illustrated, the monitoring system 100 may include student monitor 130 and instructor monitor 140. Monitoring system 100 may simultaneously provide video footage 10 to instructor user 40 and student user 45, as shown. In one version, one of the one or more video cameras 120 may include at least one instructor camera 126 integrated into instructor monitor 140. Instructor monitor 140 may be selectively positionable to capture video of instructor user 40 while instructor user 40 is viewing instructor monitor 140. Student monitor 130 may include student podium 132 for supporting student monitor 130 above the ground in some embodiments as shown. Likewise, instructor monitor 140 may include instructor podium 142 for supporting instructor monitor 140 above the ground. Preferably, student monitor 130 and instructor monitor 140 may each include rectangular sunshades 170. Rectangular sunshades 170 may be configured for preventing glare when instructor user 40 or student user 45 is viewing student monitor 130 or instructor monitor 140. Each of rectangular sunshades 170 may include top shade 172, bottom shade 174, left shade 176, and right shade 178. Top shade 172, bottom shade 174, left shade 176, and right shade 178 may be arranged perpendicularly to each other, such that they define a rectangular channel through which instructor user 40 or student user 45 may view student monitor 130 or instructor monitor 140. In a preferred embodiment, each of rectangular sunshades 170 extend up to twenty inches from student monitor 130 and alternatively instructor monitor 140.

In addition to the instructor monitor 140 and student monitor 130, various embodiments of the system employ additional monitors (not shown). These monitors can function to allow spectators to watch the instruction session or allow team members to follow along as a teammate receives instruction.

According to one embodiment, the monitoring system 100 may be arranged as a kit 105. In particular, the monitoring system 100 may further include a set of instructions 107. The instructions 107 may detail functional relationships about the structure of the monitoring system 100 such that the monitoring system 100 can be used, maintained, or the like, in a preferred manner.

Figure 2:
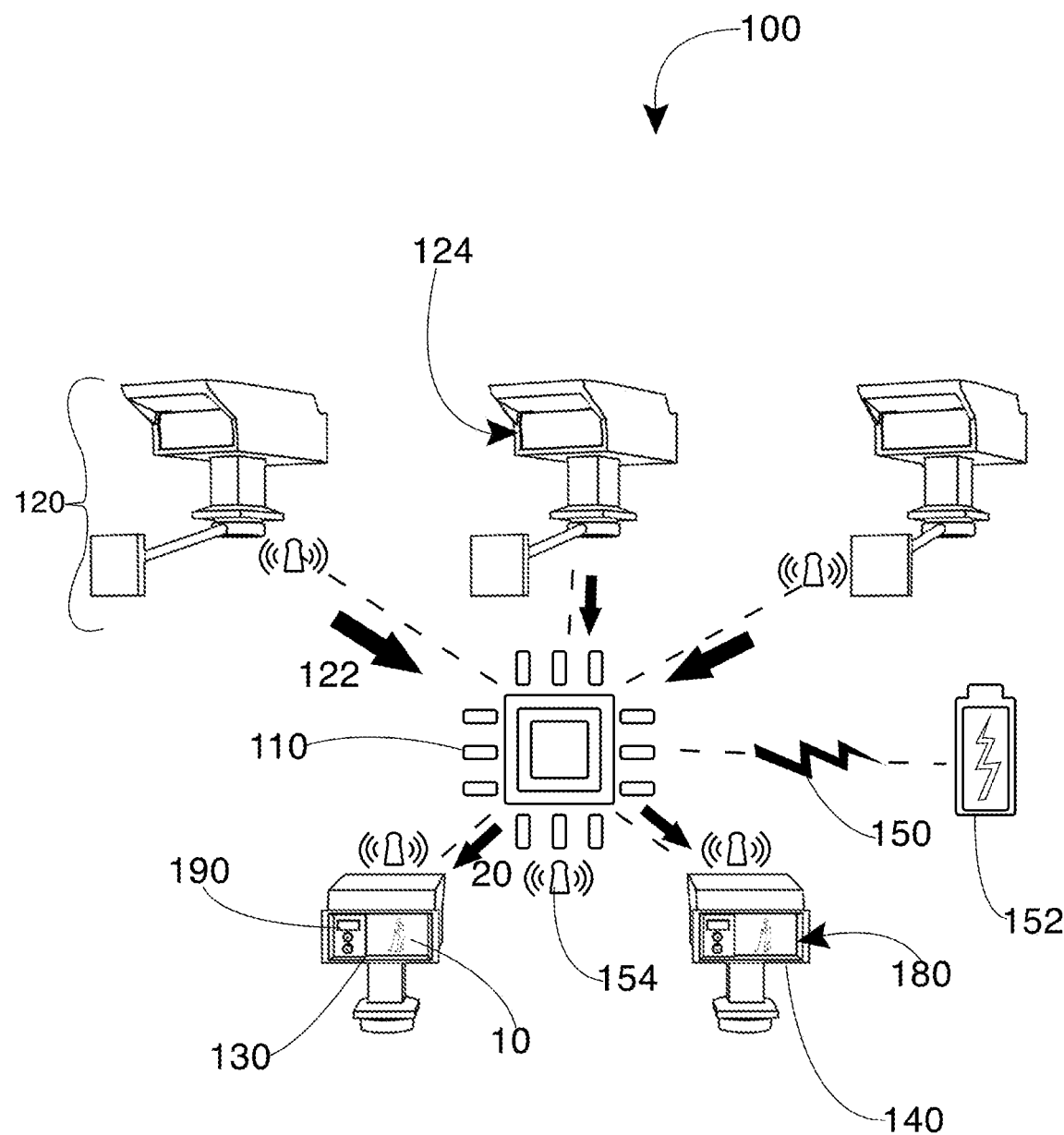
FIG. 2 is a perspective view of the monitoring system of FIG. 1, according to an embodiment of the present disclosure.

FIG. 2 shows the monitoring system of FIG. 1, according to an embodiment of the present disclosure. As above, monitoring system 100 may include student monitor 130 and instructor monitor 140. Monitoring system 100 may further include processor 110 and one or more video cameras 120. Processor 110 may be able to transmit and receive digital information 20. In particular, processor 110 may be configured to receive digital information 20 from one or more video of cameras 120 and transmit digital information 20 to student monitor 130 and instructor monitor 140. Processor 110 may receive and transmit digital information 20 wirelessly or by other means. One or more video cameras 120 may be in digital communication with processor 110 and may be configured to record video and transmit it as digital information 20 to processor 110. Student monitor 130 may also digitally communicate with processor 110 and may playback video. Likewise, instructor monitor 140 may be in digital communication with processor 110, and six configured to play video. Processor 110 transmits digital information 20 to both student monitor 130 and instructor monitor 140 simultaneously. Digital information 20 may comprise either a live video signal or a recorded video signal. Some embodiments have at least four closed circuit television cameras 124. Monitoring system 100 may further comprise power source 150 providing power to processor 110, power source 150 including at least one battery 152. Power source 150 may further comprise multiple batteries 152 providing power to processor 110, plurality of video cameras 120, student monitor 130, and instructor monitor 140. In one embodiment, processor 110, plurality of video cameras 120, student monitor 130, and instructor monitor 140 each include at least one transceiver 154. At least one transceiver 154 may be able to communicate wirelessly with processor 110 and alternatively with each other. In other embodiments, processor 110, one or more video cameras 120, student monitor 130, and instructor monitor 140 may be hard wired. In a preferred embodiment, student monitor 130 and instructor monitor 140 each include antiglare screens 180. Both student monitor 130 and instructor monitor 140 may each further include camera selection means 190: camera selection means 190 is configured to enable instructor user 40 (FIG. 1) and alternatively student user 45 (FIG. 1) to select either the live video signal or the recorded video signal corresponding to at least one video camera 120.

Figure 3:
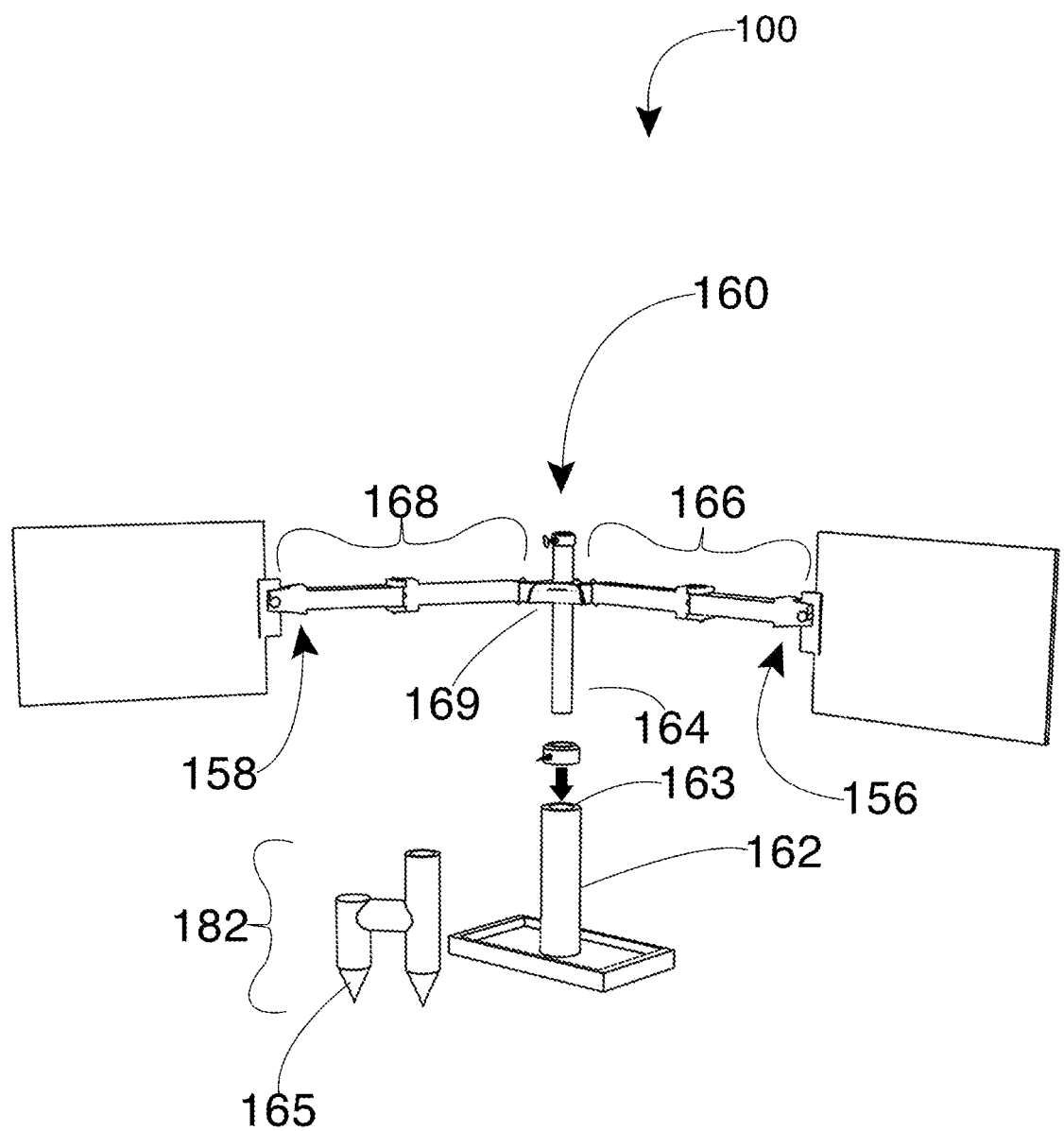
FIG. 3 is a perspective view of the monitoring system of FIG. 1, according to an embodiment of the present disclosure.

FIG. 3 is a partially exploded, perspective view of the monitor stand 160 of FIG. 1, according to an embodiment of the present disclosure. Monitoring system 100 may further include monitor stand 160 having support frame 162, vertical support 164, first cantilever 166, second cantilever 168, and cantilever mount 169. Support frame 162 may be configured to support monitor stand 160 upon the ground. Vertical support 164 may be rigidly coupled to support frame 162 and may extend outwardly from support frame 162. First cantilever 166 may couple to instructor monitor 140 for suspending instructor monitor 140 from monitor stand 160. First cantilever 166 may include first plurality of articulated joints 156 able to be selectively positioned by instructor user 40. Second cantilever 168 may be coupled to student monitor 130 for suspending student monitor 130 from monitor stand 160. Second cantilever 168 may include second plurality of articulated joints 158 able to be selectively positioned by student user 45. Cantilever interface 169 may couple both first cantilever 166 and second cantilever 168 to vertical support 164. Cantilever interface 169 may be itself articulated. In some embodiments, first cantilever 166 and second cantilever 168 may mirror each other across cantilever interface 169. Support frame 162 may include receiver 163. Receiver 163 may be tubular and may have a sufficiently large diameter to receive and support vertical support 164. Vertical support 164 may be able to rotate within receiver 163. In one embodiment, vertical support 164 may include at least one tapered terminus 165. At least one tapered terminus 165 may be configured for insertion into soil. In some embodiments, monitor stand 160 may further include stake assembly 182. Preferably, stake assembly 182 includes two of at least one tapered terminus 165. Stake assembly 182 may be insertable between support frame 162 and vertical support 164. Alternatively, stake assembly 182 may be inserted into the ground and affixed to vertical support 164, such that stake assembly 182 supports monitor stand 160. At least one tapered terminus 165 of stake assembly 182 may be insertable into receiver 163.

Figure 4:
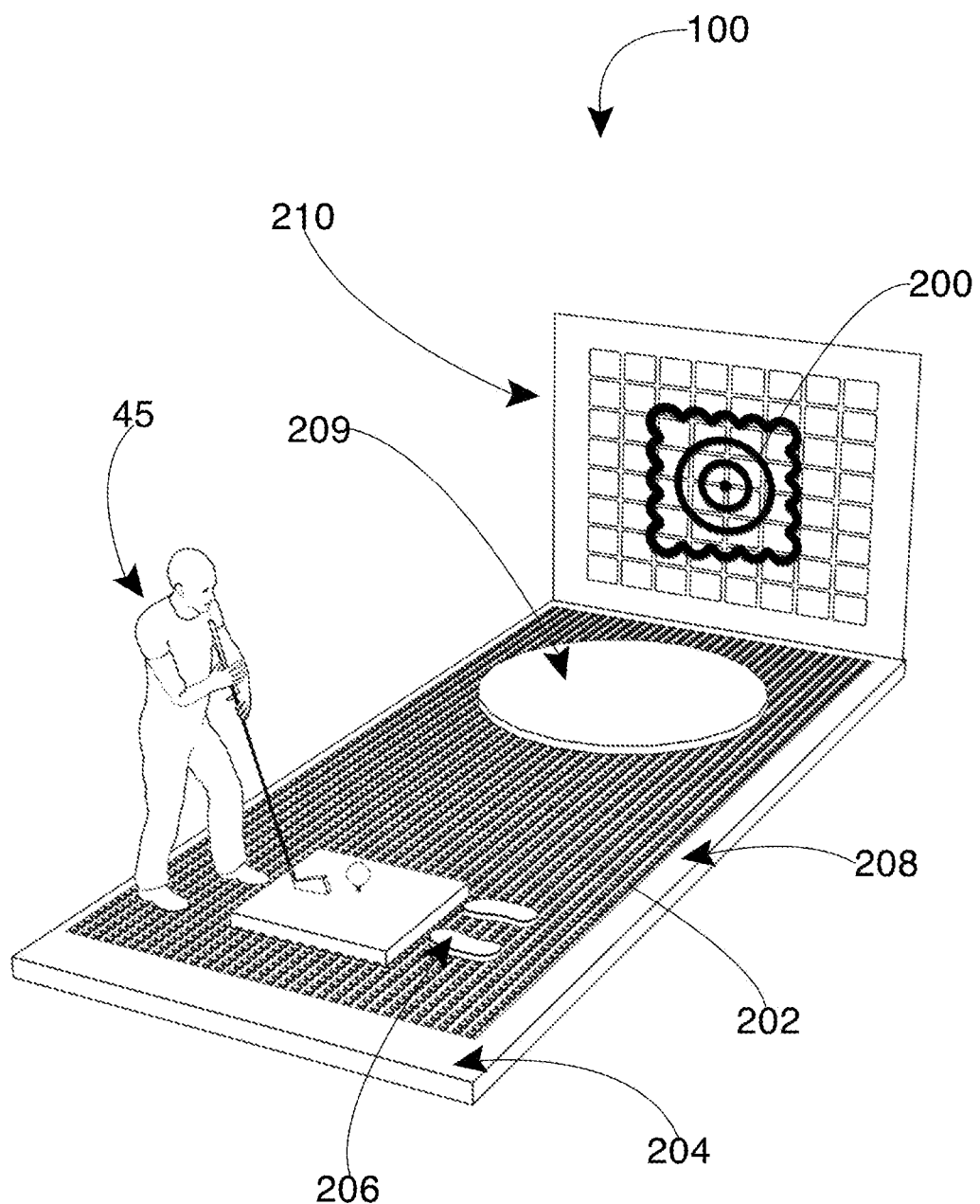
FIG. 4 is a perspective view of the portable target of the monitoring system of FIG. 1, according to an embodiment of the present disclosure.

FIG. 4 is a perspective view of the portable target of the monitoring system of FIG. 1, according to an embodiment of the present disclosure. Monitoring system 100 may further comprise portable target 200 configured to simultaneously support student user 45 and target area 209, portable target 200 having bottom surface 202, target surface 204, indicia 206, and artificial turf 208. Bottom surface 202 may be constructed of rubber, being configured to engage the ground without sliding. Target surface 204 may be disposed opposite the bottom surface, and in some embodiments may be laminated to bottom surface 202. Indicia 206 may be disposed upon target surface 204 and may be configured to indicated positions of student user 45 and target area 209. Target surface 204 may include artificial turf 208. In some embodiments, portable target 200 may further include net 210. Portable target 200 may be a unitary assembly or may be divided into its separable components in some embodiments.

Upon reading this specification, it should be appreciated that, under appropriate circumstances, considering such issues as user preferences, design preference, structural requirements, marketing preferences, cost, available materials, technological advances, etc., other structural arrangements such as, for example, additional sensory and communication features, alternative podium and support mechanism designs, various portable target configurations, etc., may be sufficient.

Figure 5:
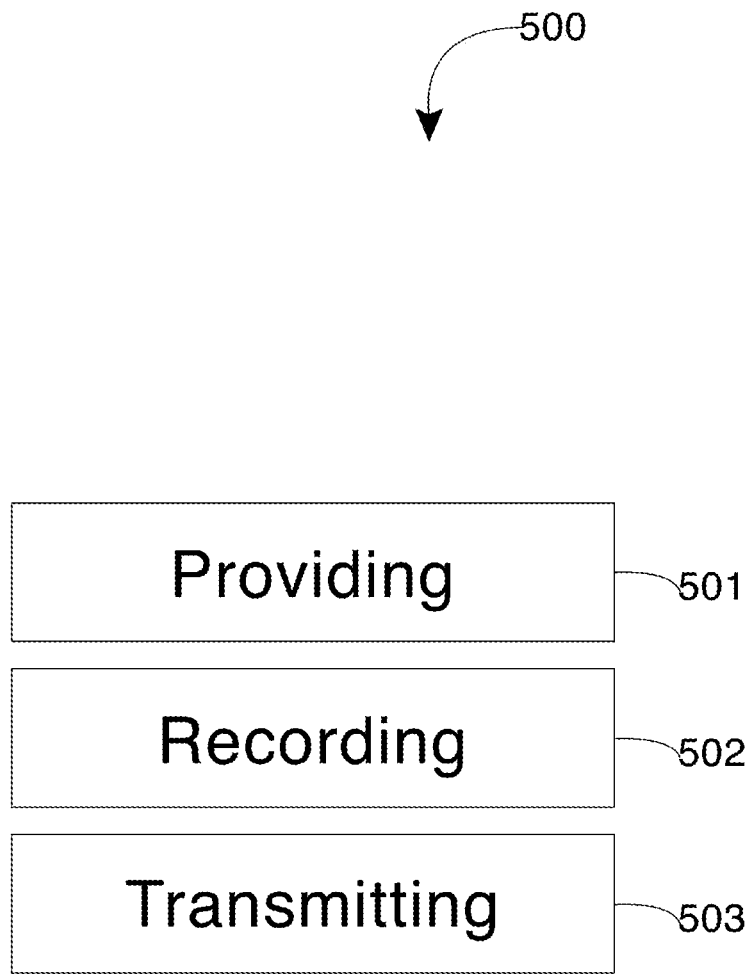
FIG. 5 is a flow diagram illustrating a method of displaying a video feed to a student and an instructor simultaneously, according to an embodiment of the present disclosure.

FIG. 5 is a flow diagram illustrating a method of displaying a video feed to a student and an instructor simultaneously, according to an embodiment of the present disclosure. In particular, the method of displaying a video feed to a student and an instructor simultaneously 500 may include one or more components or features of the monitoring system 100 as described above. As illustrated, the method of displaying a video feed to a student and an instructor simultaneously 500 may include the steps of step one 501, providing a monitoring system able to provide video footage to an instructor user and a student user simultaneously, the monitoring system comprising a processor able to transmit and receive digital information, one or more video cameras in digital communication with the processor, configured to record video and transmit a live video signal to the processor, a student monitor in digital communication with the processor, the student monitor configured to playback video, and an instructor monitor in digital communication with the processor, the instructor monitor configured to playback video, in which the processor can transmit either the live video signal or a recorded video signal to both the student monitor and the instructor monitor simultaneously. The next step, step two 502, includes recording video footage via one or more video cameras; step three 503, transmitting the live video signal from one or more video cameras to the central processor; step four 504, transmitting the live video signal from the central processor to both the student monitor and the instructor monitor simultaneously; step five 505, selecting at least one video camera for viewing; and step six 506, playing the recorded video signal for viewing.

The steps described in the method of use can be carried out in many different orders according to user preference. The use of "step of" should not be interpreted as "step for", in the claims and is not intended to invoke the provisions of 35 U.S.C. § 112(f). Under appropriate circumstances, considering such issues as design preference, user preferences, marketing preferences, cost, structural requirements, available materials, technological advances, etc., other methods of displaying a video feed to a student and an instructor simultaneously, are taught.

These embodiments are exemplary, and numerous modifications, variations, and rearrangements can be readily envisioned to achieve substantially equivalent results, all of which are intended to be embraced within the spirit and scope of the invention. Further, the purpose of the foregoing abstract is to enable the US Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is:

1. An instruction device comprising:
   three or more video cameras;
   a processor in digital communication with a video camera and first and second monitors; and
   a monitor stand having
      a support frame;
      a vertical support coupled to the support frame;
      a first bracket connecting the first monitor to the monitor stand; and
      a second articulated bracket connecting the second monitor to the monitor stand,
   wherein the processor simultaneously sends live or recorded camera video to the first and second monitors;
   wherein the processor is two processors connected by a data connection;
   wherein the data connection is one or more of a local area network, a wide area network, the internet, or a mobile phone data network;
   wherein the three or more video cameras, the first monitor, or the second monitor include a transceiver wirelessly connected to the processor;
   wherein the one or more video cameras, the first monitor, and the second monitor include a transceiver wirelessly connected to the processor;
   wherein one of the video cameras integrates into the first monitor and is configured to capture demonstration video from an instructor;
   wherein one of the video cameras integrates into the second monitor and is configured to capture practice video from a student; and
   wherein the first and second monitors have a user interface to receive commands from the instructor or the student that cause the processor to direct the live or recorded video signal to the first or second or both the first and second monitors.

2. The instruction device of claim 1, wherein the first and second monitors have a user interface to insert ancillary data from the instructor or student into the video signal.

3. The instruction device of claim 2 wherein the first bracket is a first cantilever suspending the first monitor from the monitor stand and further includes one or more articulated joints.

4. The instruction device of claim 3 wherein the second bracket is a second cantilever suspending the second monitor from the monitor stand and further includes one or more articulated joints.

5. A golf-instruction device comprising:
   at least four video cameras in digital communication with a processor and configured to record video related to a student's or instructor's swing;
   a first monitor configured to play live or recorded video in digital communication with the processor;
   a second monitor configured to play live or recorded video in digital communication with the processor;
   a power source including a battery in electrical connectivity with the processor; and
   a monitor stand having
      a support frame configured to support the monitor stand;
      a vertical support rigidly coupled to and extending from the support frame;
      a first cantilever coupled to the first monitor and the monitor stand and comprising a first plurality of articulated joints;
      a second cantilever coupled to the second monitor for and the monitor stand and comprising a second plurality of articulated joints; and
      a cantilever interface coupling the first cantilever and the second cantilever to the vertical support, wherein
   the processor simultaneously transmits the live video or the recorded video to the first and second monitors;
   the support frame includes a tubular receiver, having a diameter larger than a vertical support diameter;
   the one or more video cameras, the first monitor, and the second monitor include a transceiver wirelessly connected to the processor; and
   the first and second monitors have a user interface to receive commands from the instructor or the student that cause the processor to direct the live or recorded video signal from a camera to the first or second or both the first and second monitors.

6. A method comprising:
providing an instruction device comprising:
   three or more video cameras;
   a processor in digital communication with a video camera and first and second monitors; and
   a monitor stand having
      a support frame;
      a vertical support coupled to the support frame;
      a first bracket connecting the first monitor to the monitor stand; and
      a second articulated bracket connecting the second monitor to the monitor stand,
   wherein the processor simultaneously sends live or recorded camera video to the first and second monitors;
   wherein the processor is two processors connected by a data connection;
   wherein the data connection is one or more of a local area network, a wide area network, the internet, or a mobile phone data network;
   wherein the three or more video cameras, the first monitor, or the second monitor include a transceiver wirelessly connected to the processor;
   wherein the one or more video cameras, the first monitor, and the second monitor include a transceiver wirelessly connected to the processor;
   wherein one of the video cameras integrates into the first monitor and is configured to capture demonstration video from an instructor;
   wherein one of the video cameras integrates into the second monitor and is configured to capture practice video from a student; and
   wherein the first and second monitors have a user interface to receive commands from the instructor or the student that cause the processor to direct the live or recorded video signal to the first or second or both the first and second monitors,
recording video from the video camera;
transmitting the live video signal from one or more video cameras to the processor;
transmitting simultaneously the live video signal from the processor to the first and second monitors;
selecting at least one video camera for viewing; and
playing the recorded video signal on the first and second monitors.

* * * * *